(No Model.)
J. H. ELWARD.
CULTIVATOR.
No. 574,530. Patented Jan. 5, 1897.
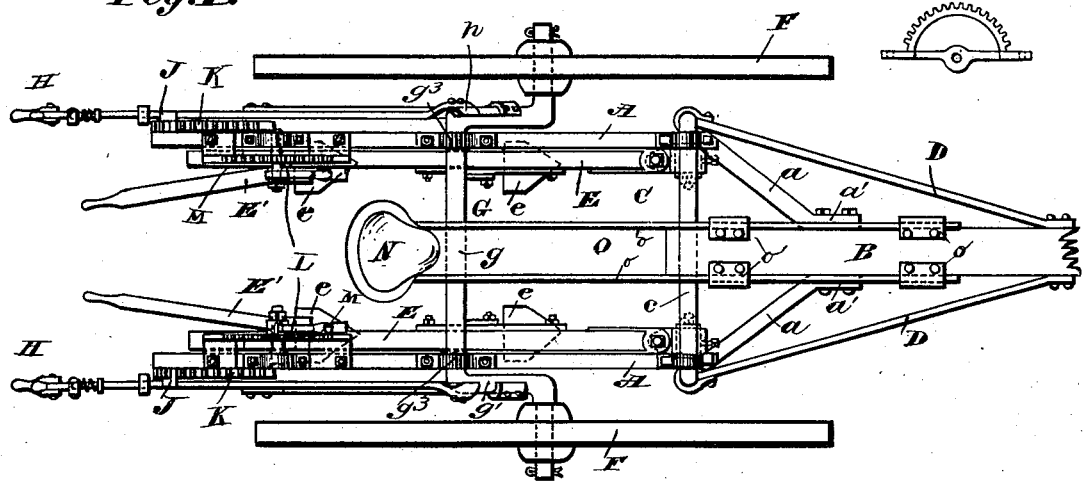
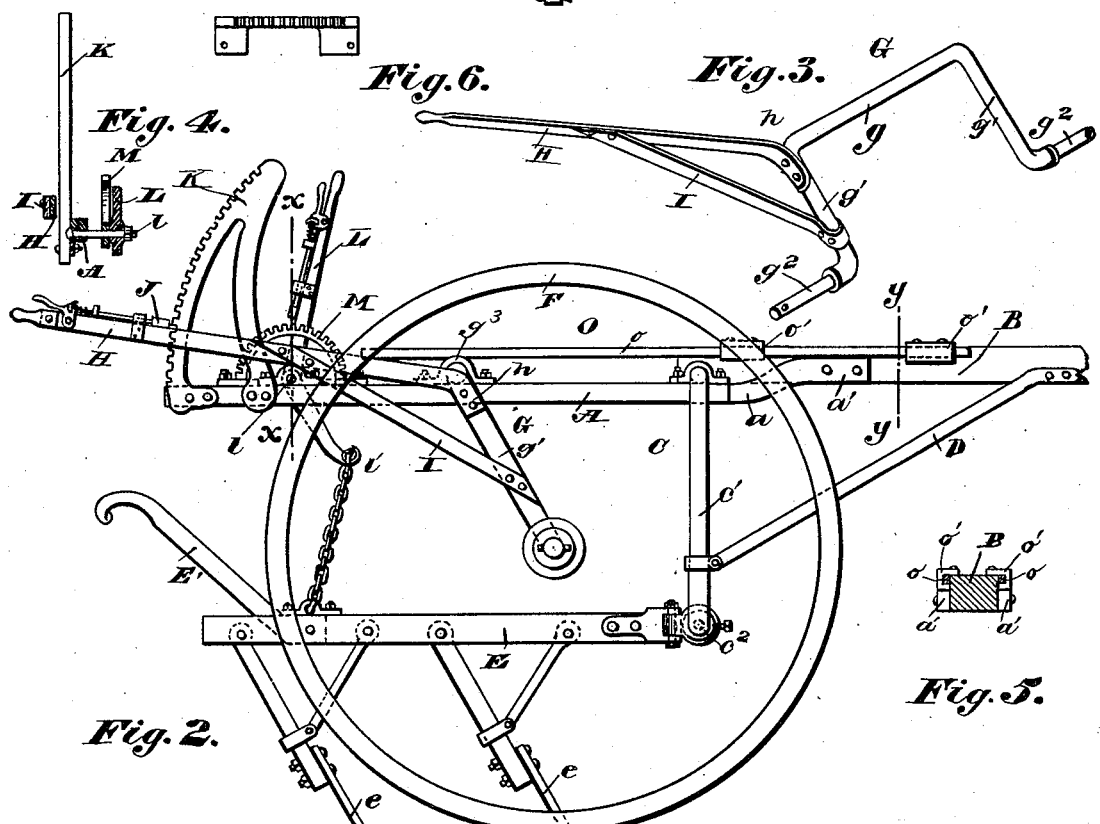
Witnesses:
Frank Blair Rives
W. H. Edwards
Inventor
John H. Elward
by H. H. Bliss Attorney.

UNITED STATES PATENT OFFICE.

JOHN H. ELWARD, OF PEORIA, ILLINOIS.

CULTIVATOR.

SPECIFICATION forming part of Letters Patent No. 574,530, dated January 5, 1897.

Application filed October 20, 1894. Serial No. 526,456. (No model.)

*To all whom it may concern:*

Be it known that I, JOHN H. ELWARD, a citizen of the United States, residing at Peoria, in the county of Peoria and State of Illinois, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a plan view of a cultivator embodying my improvements. Fig. 2 is a side elevation. Fig. 3 is a perspective showing the wheel-axle and the adjusting-levers. Fig. 4 is a cross-section on the line $x\,x$. Fig. 5 is a section on the line $y\,y$.

In the drawings I have shown a frame of one of the sorts suitable for carrying out my invention, but in this respect there can be modification. The one illustrated comprises the horizontal and longitudinally-arranged bars A A, the tongue B, the downwardly-extending bar C, and the braces D. The frame-bars A are bent inward at their forward ends, as at $a$, and secured to the tongue at $a'$. The bar C is formed with the cross top part $c$, the depending part $c'$, and the inwardly-turned spindle portion $c^2$.

E E indicate the beams or drag-bars of the plow-gangs, the plows or shovels being indicated by $e\,e$; but here also it will be understood that selection can be made of any of the numerous forms of devices used for these parts. The gangs are pivotally connected to the frame in any of the ordinary ways, preferably by means of the spindles $c^2$. At E' there are handles which can be utilized when the operator is walking.

The frame is supported upon wheels F. These are carried by a crank-axle, (indicated as a whole by G,) it having the top journal cross part $g$, the downward-extending arms $g'$, and the outwardly-turned spindles $g^2$, upon which latter the wheels are mounted. The journal portion $g$ is mounted in bearings at $g^3$, and the wheels are therefore permitted to occupy any of several positions. In order to change them from one position to another to compensate for the variations in the weights in front of their vertical plane and in rear thereof, I provide means for moving them from one position to another and for firmly securing them in position after adjustment. When the driver is walking, it is desirable to have a relatively greater part of the machine itself in rear of the wheel-spindles, and vice versa when he is riding, as at the latter time his weight must be compensated.

H indicates an adjusting-lever. Preferably it lies in lines approximately horizontal for convenience of access from the ground. It is rigidly secured to the crank-axle G, as shown at $h$.

I is a brace secured to the crank-axle at points near the wheel-spindles and also to the lever H at suitable points. It acts to strengthen the parts and to hold the wheel-spindles firmly and also to transmit some of the power from the lever directly to the lower part of the crank-axle. The lever is provided with a detent at J, which is of more or less the ordinary construction and is adapted to engage with a toothed sector K, secured to the main frame. When the wheels are to be shifted, the detent is withdrawn from the sector and the lever moved in the desired direction, and after they have been moved into the proper position it is again engaged with the sector, so as to be firmly locked.

For lifting the gangs when the driver is riding use can be made of the levers L, pivoted on studs at $l$ and having their lower ends connected by chains or other suitable devices, as at $l'$, to the beams, and by toothed segments M these levers can be locked in any desired position.

In order to brace and strengthen the crank-axle upon both sides of the machine, and also to enable the described adjustment of the wheels from the side, I prefer to have a lever H and sector J for each of the depending arms $g'$.

The driver's seat is shown at N. It is held by a carrier or support O, which is adjustably mounted on the tongue, preferably by having the bars $o$ of the carrier arranged to slide in guide-clips or equivalents, as at $o'$. The seat can be pushed forward out of the way when not in use, or it can be drawn back to one or another of several positions to support the driver, as he may require. When he is walking, the seat is pushed forward in its guide along the tongue, and by means of the lever H the axle is rocked and the wheels are thrown into their front position. When he is riding, the axle and wheels are turned into their rear position, so that his weight shall be balanced by the tongue and portions of the machine in front of the wheel-spindles.

I am aware of the fact that wheeled implements of several sorts have been provided with levers for purposes of adjustment, and therefore do not claim such matters broadly; but I believe myself to have been the first to have constructed a walking and riding cultivator of the class of that herein with the improved features which I have shown and described. The adjusting-lever, the crank-axle, the means for fastening the lever, and the framework are so related that the positions of the parts can be varied to compensate for the weights applied to the tongue when the implement is used as a walking-cultivator, on the one hand, and when it is used as a rider on the other.

What I claim is—

1. In a walking and riding cultivator, the combination of the tongue, the main frame rigidly secured to the tongue, the downward-depending rigidly-secured frame, the plows hinged to the downward-depending frame, the crank-axle extending continuously from one side of the frame to the other and hinged thereto, the wheels mounted on the said crank-axle and adapted to have their axes moved from a line in front of the rocking part of the axle to a line in the rear thereof, the lever rigidly secured to the axle and adapted to hold it in either of several positions, and the fastening devices on the main frame for holding the lever in either of two positions, substantially as set forth.

2. In a walking and riding cultivator, the combination of a rocking axle having two downwardly-depending crank-arms, the tongue, the main frame rigidly secured to the tongue, the downwardly-extending rigidly-secured plow-drawing frame in front of the wheel-spindles, the plow-gangs hinged to said downward-depending frame, the adjusting-lever connected to the plow-gangs and supported on the main frame for vertically adjusting said beams, the lever rigidly secured to the rocking axle and adapted to move the wheels from a position in front of the rocking part of the axle to a position in rear thereof and to hold the wheels in either position, and means on the main frame for locking the lever after adjustment, substantially as set forth.

In testimony whereof I affix my signature in presence of two witnesses.

JOHN H. ELWARD.

Witnesses:
M. B. MAY,
N. CURTIS LAMMOND.